United States Patent Office 3,304,288
Patented Feb. 14, 1967

3,304,288
ZINC ETHYLENE GLYCOLOXIDE AS A POLYESTER POLYMERIZATION CATALYST
Henry L. King, Cary, N.C., assignor to Monsanto Company, St. Louis, Mo., a corporation of Delaware
No Drawing. Filed July 13, 1966, Ser. No. 564,719
8 Claims. (Cl. 260—75)

This application is a continuation-in-part of my copending application, Serial No. 326,635, filed November 27, 1963, now abandoned, entitled, "Preparation of Polyethylene Terephthalate."

This invention relates to the manufacture of organic polyesters. More particularly, this invention relates to a process for preparing organic polyesters by the reaction of an aromatic dicarboxylic acid with a glycol in the presence of a novel catalyst that reduces the reaction time required for polyesterification to a defined degree of polymerization.

It is known to produce polymeric linear polyesters by heating together under prescribed conditions glycols or functional derivatives thereof and dibasic carboxylic acids or polyester-forming derivatives thereof such as acid halides, salt, or simple esters of volatile alcohols. Such polyesters when highly polymerized can be formed into filaments, fibers, films and the like that can be permanently oriented. The most widely known and most important commercially of these polymeric polyesters is polyethylene terephthalate, the production of which being disclosed in U.S. Patent No. 2,465,319. As disclosed in said patent, terephthalic acid or lower dialkyl esters thereof and ethylene glycol are condensed to form polyethylene terephthalate.

Commercially, the production of polyethylene terephthalate ordinarily involves the use of a two-stage reaction technique. In the first stage dimethyl terephthalate and ethylene glycol are reacted to form an intermediate product which is bis(beta-hydroxyethyl) terephthalate, whereby ester interchange takes place with methanol being evolved. High temperatures are necessary to effect the first stage of the reaction, and the reaction mass must be maintained at these elevated temperatures for considerable lengths of time. In the second stage the hydroxyalkyl derivative is condensed into highly polymeric polyethylene terephthalate with ethylene glycol being removed. High temperatures, as well as low pressures, are used in the second stage in order to form the polymer and to remove the ethylene glycol satisfactorily therefrom. The commercial method involves the use of dimethyl terephthalate rather than the less expensive terephthalic acid. In the ester interchange procedure prolonged periods of time are necessary to effect reaction, which are not conducive to employment of continuous production which is more desirable when operating on a commercial scale. This choice of starting material has been due to the anomalous nature of the direct reaction of terephthalic acid and ethylene glycol. Moreover, the evolved methanol must be recovered because of economic reasons.

Therefore, there has been a real commercial need for producing a synthetic linear polyester having satisfactory physical properties directly and readily from a dibasic acid and a glycol without the need of employing the two-stage technique that includes the ester interchange reaction. Unfortunately the direct reaction of terephthalic acid and ethylene glycol by known processes proceeds very slowly and/or results in the formation of undesirable byproducts. There have been a number of catalysts proposed to accelerate the reaction between a dibasic acid and a glycol. These catalysts have a disadvantage in that they can contaminate the glycol used and cause problems in the recovery and recycle of the glycol in a commercial operation. This invention discloses the use of a new catalyst which reduces the reaction time necessary in producing a synthetic linear polyester having satisfactory physical properties directly and readily from a dibasic acid and a glycol without the need of employing the two-stage technique that includes the ester interchange reaction and, in addition, reduces the glycol contamination in the reaction and increases the ease of recycling the glycol if desirable.

It is an object of this invention to provide a new and improved process for producing synthetic linear condensation polyesters.

It is another object of this invention to provide a new and improved process for producing synthetic linear condensation polyesters in which there is a reduction in the time of reaction by the direct reaction of an aromatic dicarboxylic acid and certain polymethylene glycols, and elimination of undesirable byproducts with the polyesters having properties at least equivalent to the polymer produced from the reaction of the diester of the corresponding aromatic dicarboxylic acid and the corresponding glycol.

It is another object of the present invention to provide a new and improved process for producing polyesters which are capable of being formed into filaments, fibers and the like.

Other objects and advantages of this invention will be apparent from the description which follows.

The objects of this invention are accomplished by reacting an aromatic dicarboxylic acid and a polymethylene glycol under polyesterification conditions and carrying out the polymerization step in the presence of catalytic amounts of zinc ethylene glycoloxide to give a highly polymeric polyester.

The preparation of the polyesters is conducted in the presence of catalytic amounts of zinc ethylene glycoloxide as a catalyst. The amount of catalyst employed may vary from about 0.02 to about 0.50 percent, based on the weight of the dicarboxylic acid being employed, and more preferably is varied from about 0.04 to about 0.10 percent, based on the weight of the dicarboxylic acid. The zinc ethylene glycoloxide may be conveniently prepared by heating a soluble zinc salt, such as zinc acetate or zinc propionate, with ethylene glycol at elevated temperatures sufficient to cause reaction and then removing the byproducts formed by distillation until the resulting slurry consists of zinc ethylene glycoloxide precipitate in ethylene glycol. This precipitate is then filtered out, washed and dried.

The present invention provides a novel polymerization catalyst that may be used under conditions conventional in the art for effecting polyesterification. Generally, the process for producing polyesters using the catalyst of this invention, comprises forming a reaction mixture comprising an aromatic dicarboxylic acid and a polymethylene glycol in molar excess. The reaction mixture is heated to an elevated temperature sufficient to start the reaction between the acid and glycol, with the elevated temperature being maintained until the reaction is substantially completed as indicated by the cessation of the evolution of the water of reaction, whereby bis(beta-hydroxyethyl) terephthalate and its oligomers and polymers of low degree of polymerization are formed. During this stage of reaction the temperature must be such that the water formed is continuously removed by distillation as it is formed. The distillation is controlled so that the water is removed from the system as it is formed. It is also desirable to conduct this stage of reaction under a pressure of from about 10 p.s.i.g. to 100 p.s.i.g. in order to accelerate the reaction. After the evolution of water ceases, the temperature of the reaction mixture is raised to a point above the boiling point of the polymethylene glycol in order to remove any remaining glycol and to condense the resulting intermediate product to a highly polymerized polyester. At the more elevated temperature a reduced pressure is applied to assure removal of the remaining volatile constituent. The reaction is carried out in an inert atmosphere, such as oxygen-free nitrogen and the like. The zinc ethylene glycoloxide catalyst may be added to the reaction at any point prior to the polymerization of the oligomers and low polymers. Therefore, it may be added with the acid and the glycol to start the reaction, after the formation of the oligomers and low polymers, or after the excess glycol is removed.

The synthetic linear condensation polyesters contemplated in the practice of this invention are those formed from dicarboxylic acids and glycols, and copolyesters or modifications of these polyesters and copolyesters. In a highly polymerized condition, these polyesters and copolyesters can be formed into filaments and the like.

The polyesters and copolyesters specifically useful in the instant invention are those resulting from heating one or more of the glycols of the series $HO(CH_2)_nOH$, in which $n$ is an integer from 2 to 10, with one or more dicarboxylic acids. Among the dicarboxylic acids useful in the present invention are terephthalic acid, isophthalic acid, sebacic acid, adipic acid, p-carboxyphenoacetic acid, succinic acid, p,p'-dicarboxybiphenol, p,p'-dicarboxycarbanilide, p,p'-dicarboxythiocarbanilide, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p'-dicarboxydiphenylmethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl 4-(beta-carboxy ethoxy) benzoic acid, oxalic acid, glutaric acid, pimelic acid, suberic acid, azelaic acid and the dioxy acids of ethylene dioxide having the general formula;

$$HOOC-(CH_2)_n-O-CH_2CH_2-O-(CH_2)_n-COOH$$

wherein $n$ is an integer from 1 to 4, and the like. Examples of the glycols which may be employed in practicing the instant invention are ethylene glycol, trimethylene glycol, tetramethylene glycol, decamethylene glycol, and the like. Polyethylene terephthalate, however, is preferred because of the ready availability of terephthalic acid and ethylene glycol, from which it is made. It also has a relatively high melting point of about 250 through 255° C. and this property is particularly desirable in the manufacture of filaments in the textile industry.

In the practice of the present invention, it is convenient to introduce the calculated amounts of aromatic dicarboxylic acid, polymethylene glycol, and zinc ethylene glycoloxide catalyst together in a closeable reaction vessel provided with heating and stirring means and having openings adapted for the introduction of a gas, distillation, and the application of a vacuum. The resulting mixture is heated in an inert atmosphere, such as nitrogen, to a temperature at which the reaction takes place. A preferred temperature range for this stage is about 220° to 260° C. If desired, the reaction may be carried out at pressures at, above, or below atmospheric pressure. It is desirable to carry out the reaction at pressures of from about 10 p.s.i.g. to about 100 p.s.i.g. It is desired that the water that is evolved be continuously removed by distillation. At the completion of the evolution of water, the excess glycol is distilled off and then the reaction mixture subjected to a reduced pressure. This is best accomplished by maintaining a nitrogen blanket over the reactants or other inert gas containing less than 0.003 percent oxygen and a pressure within the range of less than 1 mm. to 5 mm. of mercury. This final stage of reaction is conducted at a temperature in the range from about 220° C. to about 325° C. in order to complete the polymer formation within a reasonable time. It is important to exclude oxygen at all stages of the condensation reaction and to provide good agitation during the condensation reaction.

Although the process of this invention may be conducted stepwise, it is particularly adaptable for use in the continuous production of polyesters. The invention therefore contemplates a continuous process for the reaction of at least one polymethylene glycol as above defined with at least one aromatic dicarboxylic acid also as above defined to form a linear polyester having fiber-forming properties. The continuous process comprises the substantial completion of the reaction by feeding a molar excess of the glycol and the acid to a first reaction zone and continuously withdrawing the resulting reaction product from the reaction zone at the same rate that the reactants are introduced thereto. The water as it is formed during the reaction is removed. Thereafter, the withdrawn reaction product which comprises bis(beta-hydroxyethyl) terephthalate, its oligomers, and lowly polymerized derivatives thereof is continuously fed into a second reaction zone maintained at a temperature above the boiling point of the polymethylene glycol. During this second reaction zone excess glycol is removed from the reaction product, the glycol being recovered may be used as a feed material to the first reaction zone. Finally, the reaction product is passed through a third reaction in which the product is subjected to a high vacuum at an elevated temperature. The product that is withdrawn from the third reaction zone is a highly polymeric polyester that may be formed into filaments, films, and the like. The zinc ethylene glycoloxide catalyst may be added at any stage prior to the passage into the third reaction zone wherein the polymerization step takes place.

The condensation polyesters, produced in accordance with the present invention, have specific viscosities in the order of about 0.1 to 1.0. This represents the fiber- and filament-forming polymers. It is to be understood, of course, that nonfiber-forming polyesters may be produced by means of the present invention, which have a greater or less melt viscosity than that reiterated above. For example, polyesters which are useful in coating compositions, lacquers, and the like are within the scope of the present invention.

Specific viscosity, as employed herein, is represented by the formula:

$$\eta \text{ sp.} = \eta \text{ Rel.} - 1$$

where $\eta$ Rel. is defined as the ratio of the viscosity of a solution of 0.5 gram of the polymer in 100 ml. of m-cresol to the viscosity of the solvent, both at 25° C.

The polyesters of this invention can be produced to form filaments and films by melt spinning methods and can be extruded or drawn in the molten state to yield products that can be subsequently cold drawn to the extent of several hundred percent of their original lengths, whereby molecularly oriented structures of high tenacity can be obtained. The condensation product can be cooled and comminuted followed by subsequent remelting and processing to form filaments, films, molded articles, and the like.

Alternatively the polyesters of this invention can be processed to shaped objects by the wet spinning method, wherein the polyesters are dissolved in a suitable solvent and the resulting solution extruded through a spinneret into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or these agents may be incorporated with the initial reactants. Such added agents might be chain-branching agents, cross-linking agents, chain-terminating agents, plasticizers, pigments, dyes, anti-static agents, fire-retarding agents, stabilizers, and the like.

To further illustrate the present invention and the advantages thereof, the following specific examples are given, it being understood that these are merely intended to be illustrative and not limitative. Unless otherwise indicated, all parts and percents are by weight.

EXAMPLE 1

*Preparation of zinc ethylene glycoloxide*

Anhydrous zinc acetate (730 grams) was slurried with ethylene glycol (9 liters) in a 12-liter flask fitted with a 2-inch Oldershaw column having 10 plates. The slurry was heated on a mantle. The slurry began to clear at a temperature of 60–70° C., becoming completely clear at a temperature of 95–105° C. The heating was continued and at a temperature of 130–140° C. a crystalline product, the zinc ethylene glycoloxide, started to precipitate. When the liquid temperature reached 175–185° C., distillation began and the distillate was taken off. The vapor temperature rose during the next 3–4 hours to about 192° C. at which time the heating was discontinued and a thick slurry containing zinc ethylene glycoloxide was left. The distillate obtained contained water, the monoacetate of ethylene glycol and ethylene glycol. The zinc ethylene glycoloxide precipitate was filtered out of the thick slurry while still hot (165–170° C.) under a vacuum, then washed with 3 liters of methanol and dried in an air oven for 24 hours at 80° C. An actual yield of zinc ethylene glycoloxide equal to 95–99 percent of the theoretical yield was obtained. The product had a zinc analysis of 52.3 percent against a calculated zinc analysis of 52.1 percent.

In Examples 2–3, the following mixture was used: 200 grams of terephthalic acid, 400 ml. of ethylene glycol, and 0.08 percent, based on the weight of the terephthalic acid, of catalyst. The mixture was added directly to an autoclave and the system was purged six times with nitrogen, allowing the pressure to rise to 100 p.s.i.g., and then releasing it slowly to atmospheric pressure each time. The maximum rate of heating was then applied to the closed system, and when the temperature inside the bomb had reached 100 to 125° C., the stirrer was slowly started. When the temperature of the outside wall of the autoclave had reached 250° C. (the inside temperature being 230–235° C. and the pressure being 25 p.s.i.g.), the off-vapor valve was adjusted to maintain these conditions of temperature and pressure. As the first distillate containing water and some ethylene glycol appeared, the esterification stage was considered to have started. The stirrer speed was set at 150 r.p.m. The esterification step took about 40 minutes for completion, after which the pressure of the system was adjusted to atmospheric pressure. The heating rate was then increased until the temperature reached 275° C. During this time, excess ethylene glycol was distilled off. An ethylene glycol slurry of titanium dioxide was introduced through the injection port when the inside temperature had reached 260° to 265° C. When the inside temperature reached 275° C., vacuum was applied. The inside temperature was maintained at 275° C. and the pressure was maintained at about 0.2 mm. Hg, and the polymerization continued until the polymer had attained the required viscosity. About 50 minutes was usually required for this cycle.

The test for color indicative of bleached light stability used throughout the examples which follow consist of measurements of whiteness as calculated from the tristimulus values determined on a General Electric spectrophotometer by the methods recommended by the Standard Observer and Coordinate System of the International Commission on Illumination, as fully set forth in the Handbook of Colorimetry, published by the Technology Press, Massachusetts Institute of Technology, in 1936.

The following table gives the results obtained for each example.

| Example | Catalyst | Polymerization Time (min.) | $\eta_{sp}$ | Whiteness (percent) |
|---|---|---|---|---|
| 2 | Zinc acetylacetonate | 58 | .306 |  |
| 3 | Zinc acetate | 57 | .313 | 84.4 |
| 4 | Zinc ethylene glycoloxide | 55 | .321 | 87.3 |

These examples show the use of zinc ethylene glycoloxide in comparison with known polyesterification catalysts to give shorter polymerization times and improved whiteness values. The values given in the examples are average values for 3–4 runs.

EXAMPLE 5

A slurry of terephthalic acid and ethylene glycol, containing 40 percent by weight of acid, was fed to a horizontal, mechanically stirred reactor under the following conditions:

Pressure in reactor _____ p.s.i.g__ 30
Residence time _____ min__ 35
Temperature _____ ° C__ 250

For each 1000 grams of slurry fed to this reactor, there emerged at the other end a distillate of 330 grams (containing 70 grams of water and 260 grams of glycol) and a prepolymer of 670 grams. A 670-gram batch of this prepolymer, along with 0.16 gram of zinc ethylene glycoloxide, was placed in an autoclave equipped with stirrer. The mixture was heated at atmospheric pressure and the distillate was collected. Once the temperature within the reactor reached 275° C., the pressure was reduced to 1 mm. Hg and held, while stirring, for one hour. The resulting polymer was then forced out through a spinneret into a water bath and then taken up on a bobbin. The fiber prepared in this manner had a melting point of 248–250° C.

It is to be understood that changes and variations may be made in the present invention without departing from the spirit and scope thereof as defined in the appended claims.

What is claimed is:

1. In a process for producing synthetic, highly polymeric polyesters wherein an aromatic dicarboxylic acid and a polymethylene glycol having the formula, $$HO(CH_2)_nOH$$

wherein $n$ is an integer from 2 to 10, are reacted under esterification conditions and the reaction product is polymerized until a highly polymeric product is formed, the improvement which comprises carrying out the polymerization step in the presence of a catalytic amount of a polymerization catalyst consisting essentially of zinc ethylene glycoloxide.

2. A process as defined in claim 1 wherein the polymerization catalyst is present in an amount of from about 0.02 to 0.50 percent by weight, based on the weight of the acid.

3. A process as defined in claim 1 wherein the polymerization catalyst is present in an amount of from about 0.04 to 1.10 percent by weight, based on the weight of the acid.

4. A process as defined in claim 1 wherein the glycol used is ethylene glycol and the aromatic dicarboxylic acid used is terephthalic acid.

5. In a process for the production of a synthetic, highly polymeric polyester which comprises the steps of forming a reaction mixture of an aromatic dicarboxylic acid and a molar excess of a polymethylene glycol having the formula, $HO(CH_2)_nOH$, wherein $n$ is an integer from 2 to 10, heating said reaction mixture to an elevated temperature sufficient to induce the reaction between said acid and said glycol, maintaining the reaction mixture at the elevated temperature until the reaction is substantially completed, continuously removing the water by distillation as it is formed during the reaction, then raising the temperature of the reaction mixture in a range above boiling point of said glycol to remove excess glycol in the reaction mixture, and polymerizing the reaction mixture at an elevated temperature and under a reduced pressure until a highly polymeric product is formed, the improvement which comprises carrying out the polymerization step in the presence of a catalytic amount of a polymerization catalyst consisting essentially of zinc ethylene glycoloxide.

6. A process as defined in claim 5 wherein the polymerization catalyst is present in an amount of from about 0.02 to 0.50 percent by weight, based on the weight of the acid.

7. A process as defined in claim 5 wherein the polymerization catalyst is present in an amount of from about 0.04 to 0.10 percent by weight, based on the weight of the acid.

8. A process as defined in claim 5 wherein the glycol used is ethylene glycol and the aromatic dicarboxylic acid used is terephthalic acid.

References Cited by the Examiner
UNITED STATES PATENTS

| | | | |
|---|---|---|---|
| 2,681,360 | 6/1954 | Vodonik | 260—75 |
| 2,895,946 | 7/1959 | Huffman et al. | 260—75 |
| 2,921,051 | 1/1960 | Amborski et al. | 260—75 |
| 2,956,984 | 10/1960 | Reynolds et al. | 260—75 |
| 3,110,547 | 11/1963 | Emmert | 260—75 |
| 3,110,693 | 11/1963 | Ure | 260—75 |

FOREIGN PATENTS 805,534  12/1958  Great Britain.

WILLIAM H. SHORT, *Primary Examiner.*

L. P. QUAST, *Assistant Examiner.*